Figure 3:
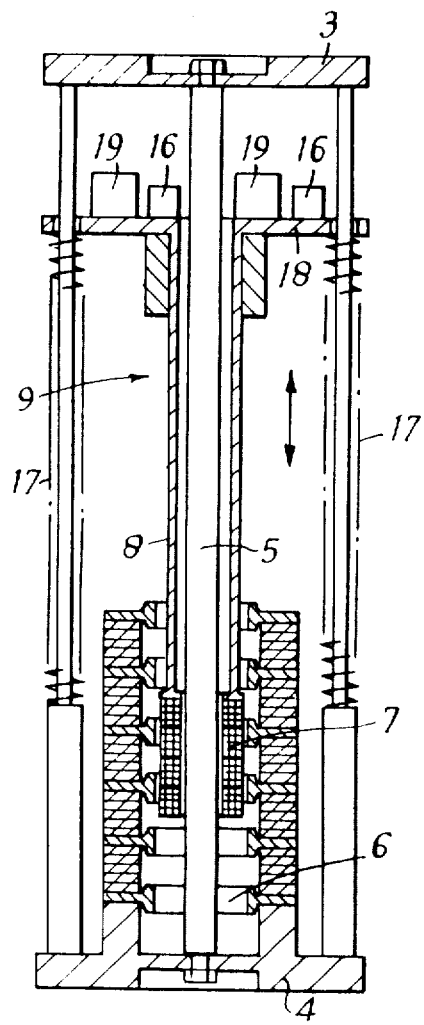

United States Patent
Last et al.

[15] 3,696,251
[45] Oct. 3, 1972

[54] METHOD OF GENERATING ELECTRICITY AND ELECTRICAL GENERATOR

[72] Inventors: James David Last, Llanfairfechan; David N. E. Rowe, Great Baddow, both of England

[73] Assignee: University College of North Wales, Bangor, North Wales

[22] Filed: June 30, 1970

[21] Appl. No.: 51,281

[30] Foreign Application Priority Data

June 30, 1969    Great Britain........33019/69

[52] U.S. Cl......................................290/53, 310/15
[51] Int. Cl..............................................F03b 13/12
[58] Field of Search.....290/1, 42, 43, 53, 54; 310/15

[56] References Cited

UNITED STATES PATENTS 3,546,473    12/1970    Rich.......................290/53 X
3,553,726    1/1971    Zimmerman................310/15

*Primary Examiner*—Bernard A. Gilheany
*Assistant Examiner*—W. E. Duncanson, Jr.
*Attorney*—Wenderoth, Lind & Ponack

[57] ABSTRACT

An electric generator for deriving electrical energy from oscillatory motion such as that of buoys, vehicles and animals. The generator has a stator and an armature coupled together by spring means and effective to generate current when bodily movement of the generator causes, by inertia effects, relative movement of the armature and stator. Particular application is in powering oceanographic buoys.

7 Claims, 8 Drawing Figures

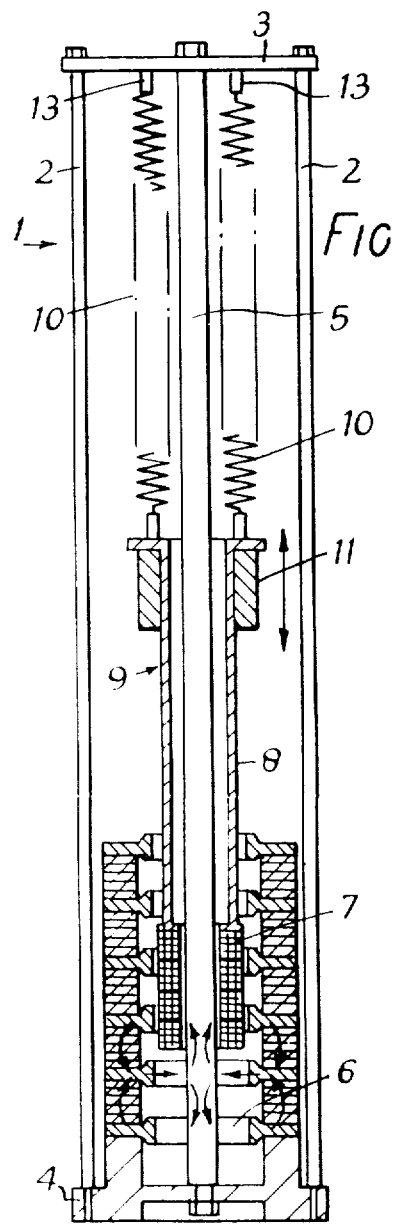
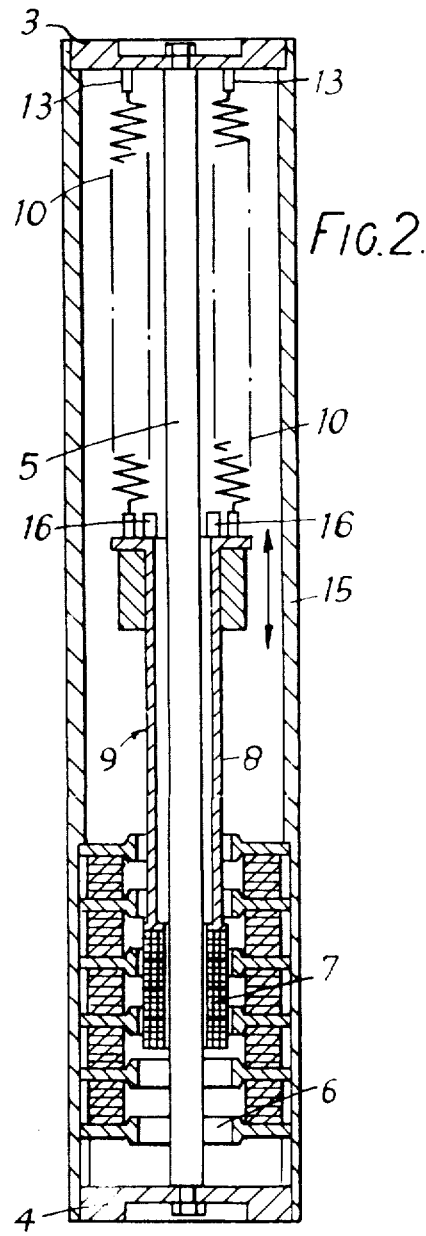

METHOD OF GENERATING ELECTRICITY AND ELECTRICAL GENERATOR

The invention relates to a generator for generating electricity from oscillatory motion such as that of sea waves, vehicle suspensions, pedestrians or animals.

According to one aspect of the invention there is provided an electric generator comprising a stator an armature movable relative to the stator, spring means coupling the armature to the stator, the arrangement being such that bodily acceleration of the generator causes relative movement of the armature and stator; and means for extracting electrical power resulting from the relative movement. It is to be understood that the stator may provide a magnetic field and the armature comprise a coil system movable in the field from which the output current is drawn. Alternatively, the armature may provide the magnetic field and the stator may carry the coil system. Conveniently the magnetic field is provided by permanent magnets.

The generator may be mounted on a floating buoy or boat, on a wheeled vehicle, or on a pedestrian or a horse, for example, in which case the said natural frequency is the frequency of vertical jogging arising at the desired walking pace. Except, perhaps when the mounts is a particular kind of vehicle the frequency of the bobbing or jerking motion which gives the accelerations necessary to generate electricity will usually have periodic times of at least ¼ second, more usually of the order of 1 or 2 seconds and sometimes, for large boats, for example, of many seconds perhaps of the order of 10 seconds or more. The natural period of oscillation of the armature and stator under the influence of the spring means is preferably between 0.25 seconds and ten seconds. This may be adjustable.

Preferably the generator has a frame to which the armature or the stator is fixed and a mass fixed to the stator or armature movable with respect to the frame.

Preferably the mass oscillates linearly and is mounted on a linear spring—conveniently a metal coil spring or a rubber spring. With this arrangement it is convenient for the stator and armature arrangement to be linear and for the mass to be fixed directly to the armature. In one embodiment of the invention the mass is a permanent magnet which constitutes the armature.

One embodiment of the invention provides a buoy including a linear generator as above described mounted vertically therein, the hydrodynamic characteristics of the buoy giving it a particular natural frequency of bobbing in the water and the natural frequency of the mass on its suspension with the buoy being arranged to be at or near the natural frequency of the buoy.

Generators in accordance with the invention may be used for recharging accumulators which power light electrical equipment such as radio receivers or transmitters, scientific instruments, recorders and the like. A buoy-mounted generator may be used to power a warning lamp or siren or power may be conveyed ashore by cable. However, particular application is found in oceanographic buoys, either anchored or free-floating, which collect data for recording or transmission. A generator of the kind described above is suitable for powering the instruments of such a buoy over long periods of time.

Figure 4:
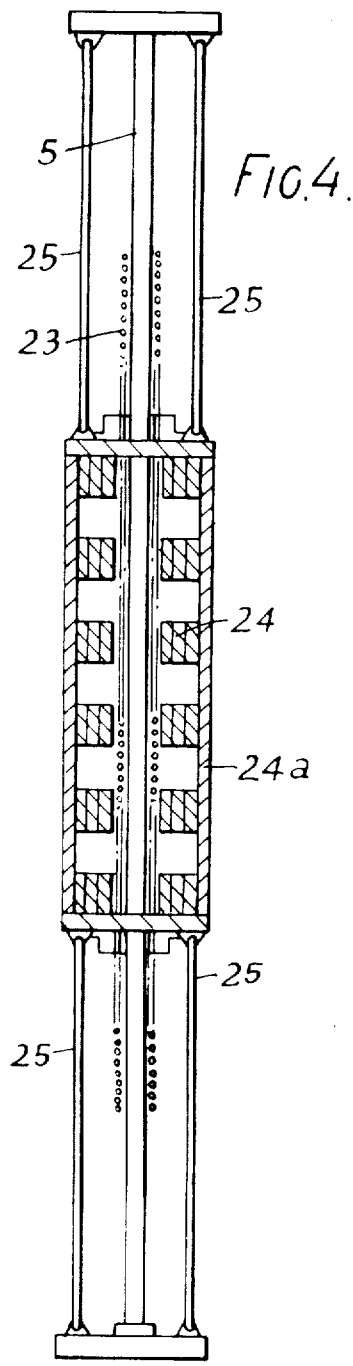
Figure 5:
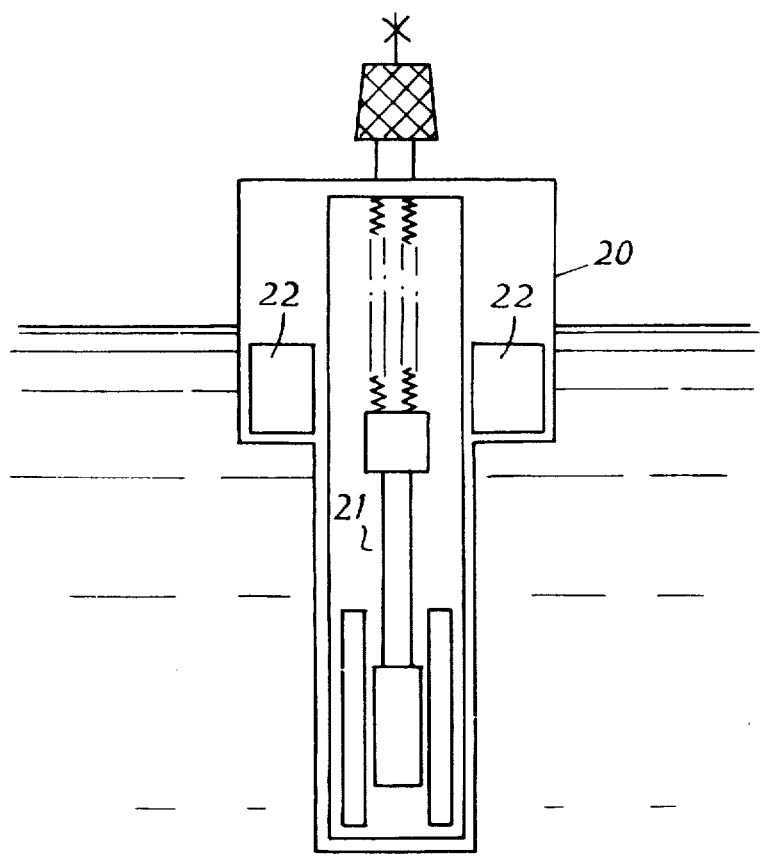
Figure 6:
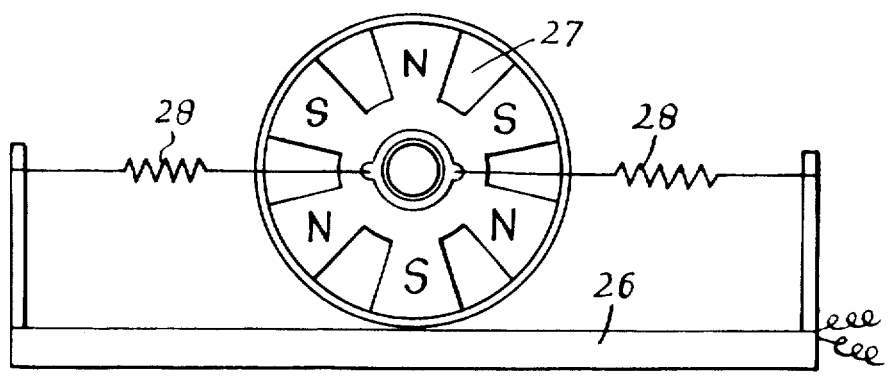
Figure 7:
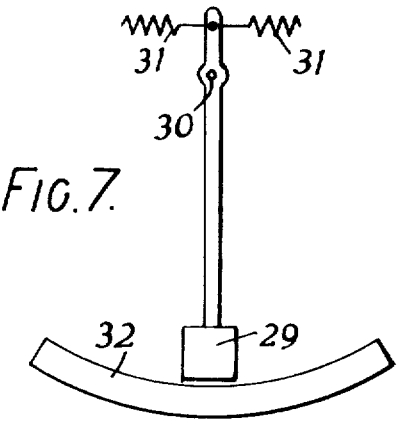
Figure 8:
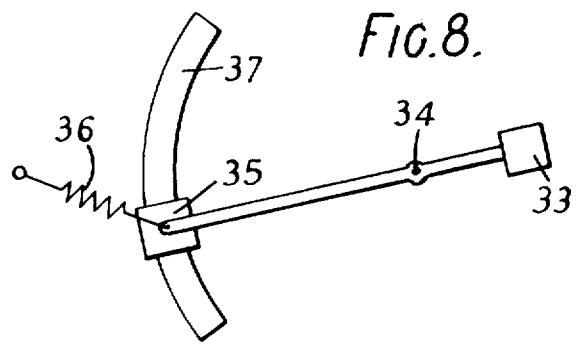

The invention will further be described with reference to the accompanying drawings, of which:

FIG. 1 is a cross-sectional elevation of a generator according to the invention;
FIG. 2 is a cross-sectional elevation of another generator according to the invention;
FIG. 3 is a cross-sectional elevation of another generator according to the invention;
FIG. 4 is a cross-sectional elevation of another generator according to the invention;
FIG. 5 is a front elevation of a form of buoy suitable for including a generator such as is shown in FIGS. 1 to 3; and
FIGS. 6, 7 and 8 are diagrams illustrating further embodiments of the invention.

Referring to FIG. 1 the generator comprises a frame 1 constituted by four rods 2 bolted at their ends to a plate 3 and a stator 4. Stator 4 is formed of permanently magnetized annular laminations of a magnetic ceramic material. Six salient poles of alternate polarity are provided. Magnetic flux paths are indicated schematically on the drawing. An axial magnetic core 5 is bolted at its ends to the plate 3 and the stator and defines with the stator an annular gap 6.

An armature 7 is wound on a cylindrical part 8 of an armature carrier 9, the armature having a two-phase distributed winding with regard to the pole spacing. The carrier 9 is suspended from the plate 3 by steel tension springs 10 and a lead mass 11 is fixed to the carrier. Output leads (not shown) are taken from the armature coils along the carrier and connected to the springs. Output current is derived from the terminals 13 connected to the upper ends of the springs. The output current is rectified and used to charge storage batteries (not shown).

Vertical accelerations of the generator as a whole give rise to linear oscillations of the armature as a result largely of the inertia of mass 11. The resulting oscillating current is rectified and used. It is beneficial to arrange that the natural period of oscillation (if any) of the driving means on which the generator is mounted is matched to the natural period of oscillation of the armature. However, the oscillatory movement of the armature is heavily damped, largely because of the extraction of electrical power. This means that in practice there is a fairly wide matching tolerance and although it is not envisaged that the generator will be used with driving means having a natural period of more than 10 seconds or so (e.g. a sea swell) it may be possible to derive satisfactory results from a generator the natural frequency of which is up to 10 seconds. The natural period of the generator may be adjusted if desired by adjustment of the mass 11 or by changing the springs, for example.

Damping is minimized by nylon collar bearings or ball or roller bearings (not shown) by which the armature carrier is mounted on the core.

Typical operational data for one prototype example of a generator constructed in accordance with FIG. 1 are as follows:

| | |
|---|---|
| Approximate weight of prototype assembly | 100Kg. |
| Height of prototype assembly | 2M. |
| Ratio of mass to spring rate | 1:15.5 |
| Resonance of suspended system | 1.5 sec. period (approx) |
| Ratio of flux density to turns in electrical system (derived from 1,000 T/phase and 0.5W/$_M$Flux) | 0.5mW/$_M$2/turn |
| Magnetic ceramic material | Magnadur II |
| Power output (of the order of) | 7.5 Watts |

Referring now to FIG. 2 there is shown a generator similar to that of FIG. 1. The principal difference is that a cylindrical casing 15 is provided instead of the rods 2 of FIG. 1. This gives a more compact and stronger assembly. In addition, casing 15 is hermetically sealed at its ends to plate 3 and the stator. The interior of the casing is filled with nitrogen which affords corrosion protection. Another difference over the FIG. 1 arrangement is that rectifiers and charging control circuitry 16 are carried by the armature carrier, the armature winding being connected to the rectifiers which give a direct current output through the springs to charge the batteries (not shown).

Referring now to FIG. 3 there is shown a modification of the generator in which the armature carrier is mounted on compression springs 17 wound on the rods 2 of the frame. This gives a construction which is shorter and wider than the arrangements described with reference to FIGS. 1 and 2. Also, the platform 18 of the armature carrier supports the batteries 19 as well as rectifiers and charging control circuitry 16. This means that mass 11 can be reduced considerably.

FIG. 4 shows an alternative arrangement for the generator in which the stator is constituted by the two-phase coil 23 wound on the core 5. The armature is constituted by a permanent magnet assembly 24 which is similar to the stator assemblies of FIGS. 1 to 3 but which is mounted in a mild steel yoke 24a and arranged to be movable longitudinally, it being suspended for oscillation by elastic thongs 25.

FIG. 5 shows schematically an oceanographic research buoy which carries a generator as described with reference (for example) to FIG. 1. The buoy has a body 20 in which the generator 21 and storage batteries 22 are housed. The buoy carries research instruments which are powered by the batteries and a radio transmitter also powered by the batteries whereby information from the instruments is transmitted. It is found that for optimum results in given seas a good natural period of oscillation for the armature is 1.5 seconds.

Referring now to FIG. 6 there is shown a generator in accordance with the invention which is particularly suitable for deriving electricity from rolling motion. The generator comprises a platform 26 of magnetic material in which is wound a distributed two-phase winding (not shown). A cylindrical armature 27 is allowed to roll from side to side across the platform under restraint from springs 28. The armature comprises a magnet with six poles of alternate polarity and as the armature rolls because of the effects of inertia, flux from the magnets cuts the stator coils and generates current therein.

FIG. 7 shows an embodiment of the generator constituted by a permanent magnet 29 which is the bob of a pendulum pivoted at 30 and restrained by springs 31. The stator is constituted by a two-phase winding on an arcuate magnetic former 32.

FIG. 8 shows another pendulum arrangement, in which the pendulum is compound, having a mass 33 on one side of the pivot 34 and a magnet 35 on the other side of the pivot. A single tension spring 36 serves to urge the magnet to a central position with respect to a distributed coil system 37 constituting the stator.

It is to be understood that the invention is not restricted to the details of the foregoing description made with reference to the drawings. For example, it is clear that the roles of the armature and stator may be reversed — the stator may be wound and/or may be movable whereas the armature may be constituted by a permanent magnet and/or may be fixed. Instead of current being extracted by means of the springs, flexible leads may be used. A coaxial rotary system in which the spring constraint is applied and coil moves relative to field may also be employed (e.g., for rolling applications). It is envisaged that size may vary from approximately $0.5m^3$ volume (giving perhaps up to 50W power) to $0.01m^3$ (giving perhaps 0.5W power), the example given with reference to FIG. 1 having a volume of $0.2m^3$ and giving 7.5W power. Generators may be single phase, two-phase, or multiple phase as best to use the available winding volume. Clearly, a linear arrangement such as that shown in FIG. 1 may be operated horizontally in some applications instead of vertically as shown.

We claim:

1. An electric generator comprising a stator with a longitudinal axis, the stator having a magnetic core extending along said axis; a multi-polar permanent magnet assembly fixed with respect to the core and spaced apart therefrom to define therewith a longitudinal gap parallel to the axis and establishing a magnetic field across the gap; an armature winding situated in the gap, the armature winding being composed of a plurality of distributed phase windings and being movable longitudinally in the gap; spring means coupling the armature winding to the stator, the arrangement being such that bodily acceleration of the generator causes movement of the armature winding in the gap; and means for extracting electrical power from the armature resulting from said movement.

2. An electric generator as claimed in claim 1 wherein the natural period of oscillation of the armature winding and permanent magnet assembly is between 0.25 and 20 seconds.

3. An electric generator as claimed in claim 1 wherein the armature winding is carried on a carrier, the output therefrom is rectified by rectifiers carried on the armature carrier and the rectified output is used to charge storage batteries.

4. An electric generator as claimed in claim 3 wherein the storage batteries are also carried on the armature carrier.

5. An electric generator as claimed in claim 1 carried in a buoy adapted to float in the sea.

6. An electric generator as claimed in claim 5 wherein the natural period of oscillation of the armature winding and permanent magnet assembly is approximately 1.5 seconds.

7. An electric generator as claimed in claim 1 included in a sealed housing which is evacuated or filled with nitrogen.

* * * * *